US010117185B1

(12) United States Patent
Lin et al.

(10) Patent No.: US 10,117,185 B1
(45) Date of Patent: Oct. 30, 2018

(54) CONTENT-AWARE ENERGY SAVINGS FOR VIDEO STREAMING AND PLAYBACK ON MOBILE DEVICES

(71) Applicant: Futurewei Technologies, Inc., Plano, TX (US)

(72) Inventors: Zongfang Lin, Santa Clara, CA (US); Jun Wang, Santa Clara, CA (US); Karthik Rao, Atlanta, GA (US); Chen Tian, Union City, CA (US); Handong Ye, Sunnyvale, CA (US); Ziang Hu, Union City, CA (US)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 15/423,490

(22) Filed: Feb. 2, 2017

(51) Int. Cl.
*H04W 52/02* (2009.01)
*G06F 1/32* (2006.01)
(Continued)

(52) U.S. Cl.
CPC ...... *H04W 52/0248* (2013.01); *G06F 1/3228* (2013.01); *G06F 9/30123* (2013.01);
(Continued)

(58) Field of Classification Search
CPC ............. H04W 52/02; H04W 52/0261; H04W 52/027; H04W 52/0287; G06F 1/32;
(Continued)

(56) References Cited

U.S. PATENT DOCUMENTS 8,996,711 B2 * 3/2015 van Riel ................ G06Q 30/02
709/230
2007/0242926 A1 10/2007 Huang et al.
(Continued)

FOREIGN PATENT DOCUMENTS

CN 1653809 A 8/2005
CN 101980531 A 2/2011
(Continued)

OTHER PUBLICATIONS

Lin et al., U.S. Appl. No. 15/423,542, filed Feb. 2, 2017.

*Primary Examiner* — Blane Jackson
(74) *Attorney, Agent, or Firm* — FutureWei Technologies, Inc.

(57) ABSTRACT

A system, computer readable medium, and method are provided for reducing the power consumption of a mobile device. The method includes the steps of detecting video content to be viewed in an application executed by the mobile device; detecting unwanted content associated with the video content; and operating the mobile device in a low-power mode during playback of the video content in the application in response to detecting the unwanted content. The mobile device may include a memory storing the application and a processor executing the application, which configures the processor to implement the method. Five techniques may be applied in the low-power mode to reduce power consumption including Dynamic Voltage and Frequency Scaling (DVFS), reducing resolution of content, reducing brightness of a display, masking content, and thread throttling. The low-power mode saves energy when playing back videos on the mobile device.

17 Claims, 8 Drawing Sheets

(51) Int. Cl.
    *H04L 29/06*     (2006.01)
    *G06Q 30/02*     (2012.01)
    *G06F 9/30*      (2018.01)
    *G06F 17/22*     (2006.01)
    *G09G 5/391*     (2006.01)

(52) U.S. Cl.
    CPC ..... *G06F 17/2247* (2013.01); *G06Q 30/0241* (2013.01); *G09G 5/391* (2013.01); *H04L 65/4069* (2013.01); *H04W 52/027* (2013.01); *H04W 52/0258* (2013.01)

(58) Field of Classification Search
    CPC ........ G06F 1/3228; G06F 1/3234; G06F 9/30; G06F 9/30123
    See application file for complete search history.

(56) References Cited

U.S. PATENT DOCUMENTS

| | | | |
|---|---|---|---|
| 2009/0222510 A1* | 9/2009 | van Riel | G06Q 30/02 709/203 |
| 2010/0035656 A1* | 2/2010 | Pan | G06F 1/1626 455/566 |
| 2010/0036734 A1* | 2/2010 | Pan | G06Q 30/02 705/14.55 |
| 2017/0221109 A1* | 8/2017 | Liu | G06Q 30/0272 |

FOREIGN PATENT DOCUMENTS

| | | |
|---|---|---|
| CN | 101996313 A | 3/2011 |
| CN | 103747288 A | 4/2014 |
| WO | 03096686 A1 | 11/2003 |

\* cited by examiner

CONTENT-AWARE ENERGY SAVINGS FOR VIDEO STREAMING AND PLAYBACK ON MOBILE DEVICES

FIELD OF THE INVENTION

The present invention relates to energy efficiency, and more particularly to power saving methods associated with streaming or playback of video with embedded advertisements.

BACKGROUND

The battery capacity of mobile devices such as tablet computers and smart phones is extremely important to the consumer's satisfaction with the device. A single/full charge of a battery may need to last 6-8 hours in order for the consumer to use the device while on the go. Each manufacturer of these devices has poured significant resources into implementing techniques to reduce the power consumption of the device in order to extend the life of the battery during operation. Separate power management chips may be used to power gate certain components of the device. In addition, software solutions have been implemented to reduce the power consumption of the device, such as by reducing the number of active threads in a low-power mode or reducing the brightness of a display.

Typically, a significant portion of the energy consumed by a mobile device is devoted to powering a display device. For example, a backlight of the display may draw a significant amount of power to turn on at the brightest setting. In addition, one or more graphics processing cores in a graphics processing unit (GPU) or system-on-chip (SoC) may be dedicated to generating pixel data for presentation on the display device. This activity may rapidly drain the battery, rendering the mobile device inoperable after only a short period. Thus, there is a need for addressing this issue and/or other issues associated with the prior art.

SUMMARY

A system, computer readable medium, and method are provided for reducing the power consumption of a mobile device. The method includes the steps of detecting video content to be viewed in an application executed by the mobile device; detecting unwanted content associated with the video content; and operating the mobile device in a low-power mode during playback of the video content in the application in response to detecting the unwanted content.

In a first embodiment, the unwanted content includes advertising content included in the video content as one or more frames of video.

In a second embodiment (which may or may not be combined with the first embodiment), the unwanted content is embedded within a markup language document displayed in a web browser. The video content is displayed next to the unwanted content when the markup language document is rendered into the web browser.

In a third embodiment (which may or may not be combined with the first and/or second embodiments), operating the mobile device in the low-power mode may include operating the mobile device using Dynamic Voltage and Frequency Scaling (DVFS) to adjust power consumption of a processor included in the mobile device. The low-power mode may also include reducing the resolution of a display device included in the mobile device. The low-power mode may also include reducing a brightness level of the display device. In some embodiments, the low-power mode may implement two or more of the aforementioned techniques to reduce power consumption.

In a fourth embodiment (which may or may not be combined with the first, second, and/or third embodiments), the video content is displayed in an embedded mode. The low-power mode may include operating the mobile device by masking the unwanted content and/or throttling one or more threads associated with the unwanted content.

In a fifth embodiment (which may or may not be combined with the first, second, third, and/or fourth embodiments), the application includes a plug-in configured to call an application programming interface (API) method in response to detecting the unwanted content to cause the mobile device to enter the low-power mode.

In a sixth embodiment (which may or may not be combined with the first, second, third, fourth, and/or fifth embodiments), the API is implemented by a device driver executed in a kernel-space of an operating system.

In a seventh embodiment (which may or may not be combined with the first, second, third, fourth, fifth, and/or sixth embodiments), detecting unwanted content may include steps for identifying markers included in metadata associated with the video content. The markers specify explicit start points and end points of advertising content included in the video content. Detecting unwanted content may also include utilizing user feedback to identify explicit start points and end points of advertising content included in the video content. Finally, detecting unwanted content may also include analyzing the video content to identify keywords or images corresponding to advertising content.

In an eighth embodiment (which may or may not be combined with the first, second, third, fourth, fifth, sixth, and/or seventh embodiments), detecting video content includes steps for parsing a markup language document to identify a multimedia element that includes a pointer to a video file.

To this end, in some optional embodiments, one or more of the foregoing features of the aforementioned apparatus, system, and/or method may afford a more efficient way to configure exploration operations of large data sets that, in turn, may enable data analysts to work more efficiently and reduce errors in the results obtained by the exploration operations. It should be noted that the aforementioned potential advantages are set forth for illustrative purposes only and should not be construed as limiting in any manner.

DETAILED DESCRIPTION

Much effort has been expended designing techniques to reduce power consumption of electronic devices. Mobile devices particularly benefit from these efforts as reducing power consumption extends battery life, thereby enabling these devices to be used for longer amounts of time before requiring re-charging of the battery. Solutions for reducing power consumption may focus at least some of their attention on reducing the power consumption of a display device. The main energy consumers associated with a display device are the backlight, an active matrix of liquid crystals, and the processors tasked with generating pixel data for display on the device. For example, some LED backlight televisions have been designed with an array of LEDs positioned behind the array of liquid crystal elements so that the brightness of the backlight can be dimmed in areas of the screen associated with darker colors. Local area dimming can significantly reduce the power consumed by the display device.

Other techniques can be employed to reduce the power consumed by a display device as well. Some examples of these techniques are dynamic frequency and voltage scaling (DFVS) for the processor tasked with generating pixel data for display, reducing resolution of the rendered pixel data, throttling processing capacity dedicated to rendering operations, and so forth. However, these techniques typically have an adverse effect on the operation of the device. For example, the frequency of the clock of a processor may need to be reduced in order to reduce the operating voltage of the processor. A user may notice significant delays when performing certain operations under these conditions. As another example, reducing the brightness of the display device or the resolution of the images presented on the display device can have an adverse effect on image quality when compared to normal operation. A consumer may not accept this reduction in performance in order to extend the battery life of the device during normal use. However, the consumer may be able to put up with the reduction in performance at certain times, such as when the battery is nearly drained.

One of these times may be when the consumer is being forced to watch advertising content. Advertising revenue is the main source of income for many content providers that distribute content online. Web pages viewed in a web browser may include banner advertisements or sponsored links designed to redirect users to an advertiser's website. Some websites automatically play embedded video content when a web page is loaded into a browser window. Video content may include files having a video format including, but not limited to, MPEG-4 AVC (Moving Picture Experts Group 4, Part 10/H.264), AVI (Audio Video Interleave), and MOV (Apple Quicktime Movie) as well as other suitable video formats are possible. Video content delivered to a viewer may include advertising content that is contained directly in the video content, forcing the viewer to watch the advertising content in order to view the video content.

In addition to advertising content, web pages may include other additional content that is secondary to the primary content of the web page. This additional content may include navigation bars, sidebar information, links to other pages on the same website (e.g., links to other articles on a news aggregation website), and so forth. This additional content may not strictly be defined as advertising content such as banner ads linked to a page promoting a certain product or service. Nevertheless, the additional content may be secondary to the primary content included in a webpage (e.g., a news article or video included in the body of the webpage).

A viewer is more than likely not as engaged when being forced to watch such advertising content in addition to the primary content that is the focus of the web page. Consequently, the playback of advertising content or the simultaneous display of such additional content creates an ideal opportunity to operate the device in a low-power mode in order to reduce power consumption of the device and extend the battery life. The experience of using the device in a low-power mode is not likely to be as distracting to a consumer if the device is in the low-power mode when the advertising content is being displayed and then returned to a normal mode once the viewer returns to viewing the content of their choice.

Figure 1:
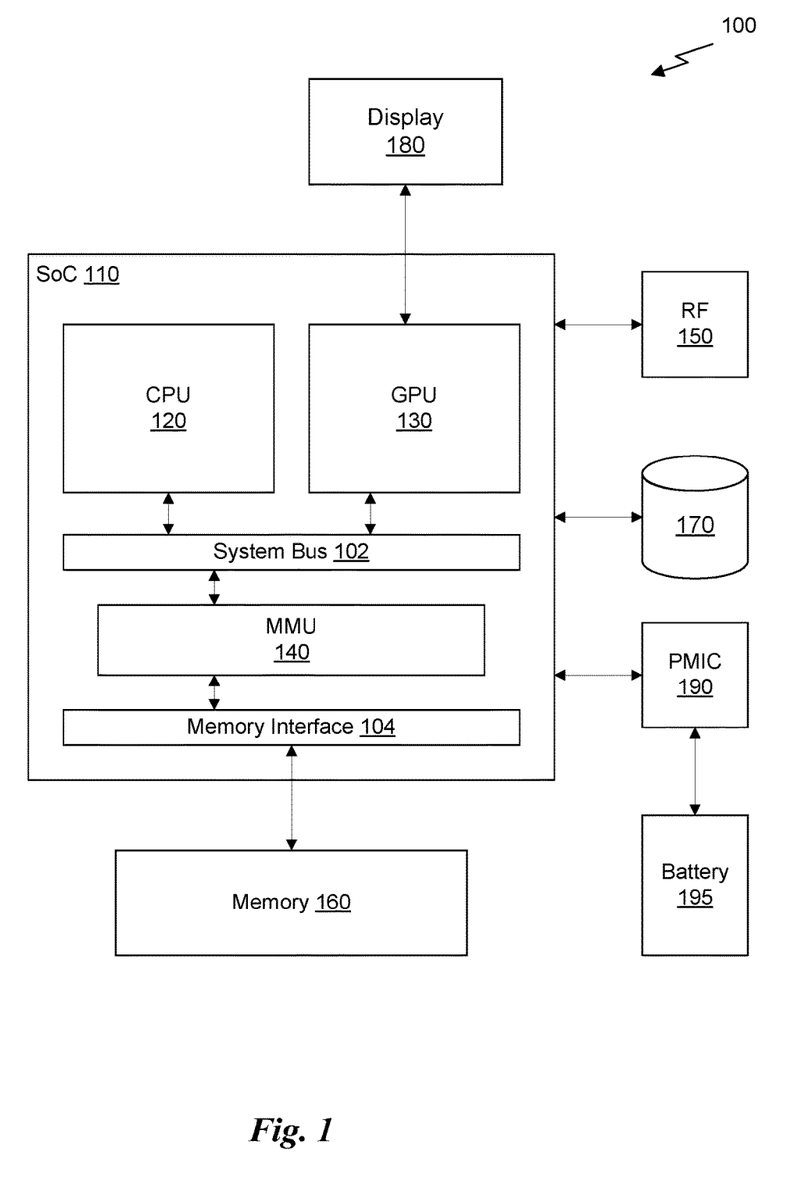
FIG. 1 illustrates a mobile device, in accordance with one embodiment.

FIG. 1 illustrates a mobile device 100, in accordance with one embodiment. The mobile device 100 may be a smart phone or tablet computer or other type of electronic device including a battery as the primary source of power. As shown in FIG. 1, the mobile device 100 includes a system-on-chip (SoC) 110 coupled to a memory 160 and a display device 180. The SoC 110 is a processor implemented on an integrated circuit. The memory 160 is a volatile storage such as synchronous dynamic random access memory (SDRAM). An operating system, applications, and/or data may be stored in the memory 160 during operation. In one embodiment, the SoC 110 may be included with one or more discrete memory ICs in a package on package (PoP) configuration.

The display device 180 may be a liquid crystal display (LCD), organic light emitting diode (OLED), active matrix OLED (AMOLED), or the like. In one embodiment, the display device 180 implements touch functionality such as by including capacitive touch sensing technology integrated into a layer of the display device 180. In some embodiments, such as LCD displays, the display device 180 may also include a backlight and backlight controller. The backlight may be one or more LEDs configured to generate a diffuse white light that is transmitted through a layer of liquid crystal elements. The backlight controller may be implemented as logic within an IC for controlling the operation of the LEDs. The backlight may be adjusted via the backlight controller to control a brightness of the display device 180.

In one embodiment, the SoC 110 includes at least one CPU 120, at least one GPU 130, a system bus 102, a memory management unit (MMU) 140, and a memory interface 104. The CPU 120 is a general purpose processor having one or more cores. In one embodiment, the CPU 120 is a RISC (reduced instruction set computer) processor core such as an ARM® Coretex processor. The GPU 130 is a parallel processing unit including of one or more cores configured to process graphics or other data in a parallelizable manner. The GPU 130 may be implemented with SIMD (single instruction, multiple data) architecture. In one embodiment, the GPU 130 includes one or more ARM® Mali GPU cores.

The memory 160 is coupled to the memory interface 104 such that instructions and data can be loaded into on-chip memory within the CPU 120 and/or GPU 130. The MMU 140 manages memory access requests generated by one or more components of the SoC 110. The MMU 140 may also translate virtual addresses associated with the memory access requests into physical addresses associated with locations in the memory 160.

The mobile device 100 is also coupled to a radio frequency transceiver 150, a non-volatile storage device 170, and a power management integrated circuit (PMIC) 190. The radio frequency transceiver 150 may include at least one antenna and logic for encoding or decoding signals transmitted from or received by the mobile device 100. For example, the mobile device 100 may include a radio for transmitting cellular signals on one or more cellular frequency bands. Alternatively, the RF transceiver 150 may be configured to transmit signals over Wi-Fi (e.g., within the 2.4 GHz or 5 GHz bands). The non-volatile storage device 170 may be a hard disk drive (HDD), solid state drive (SSD), flash memory such as an EEPROM or Compact Flash (CF) Card, and the like. The non-volatile storage device 170 may store the operating system, applications, and/or data that can be loaded into the memory 160 during normal operation.

The PMIC 190 is configured to perform power management operations of the mobile device 100. In one embodiment, the PMIC 190 converts the DC power supply from a battery 195 to a supply voltage provided to the SoC 110. The PMIC 190 may also be configured to implement dynamic voltage and frequency scaling (DVFS) by adjusting a level of the supply voltage provided to the SoC 110 and/or a frequency of the clock domain utilized by the SoC 110. The PMIC 190 may also be configured to manage charging of the battery 195 when the mobile device is plugged into an external power source. In some embodiments, the PMIC 190 is integrated into the SoC 110 rather than being included as a separate IC within the mobile device 100.

It will be appreciated that the mobile device 100 shown in FIG. 1 is only one exemplary embodiment of a mobile device. In different embodiments, the mobile device 100 may include separate and distinct CPU and/or GPU ICs rather than the SoC 110. In other embodiments, the mobile device 100 may include other types of components in addition to or in lieu of the components shown in FIG. 1. For example, the mobile device 100 may include a microphone and/or speakers coupled to I/O ports of the SoC 110.

Figure 2:
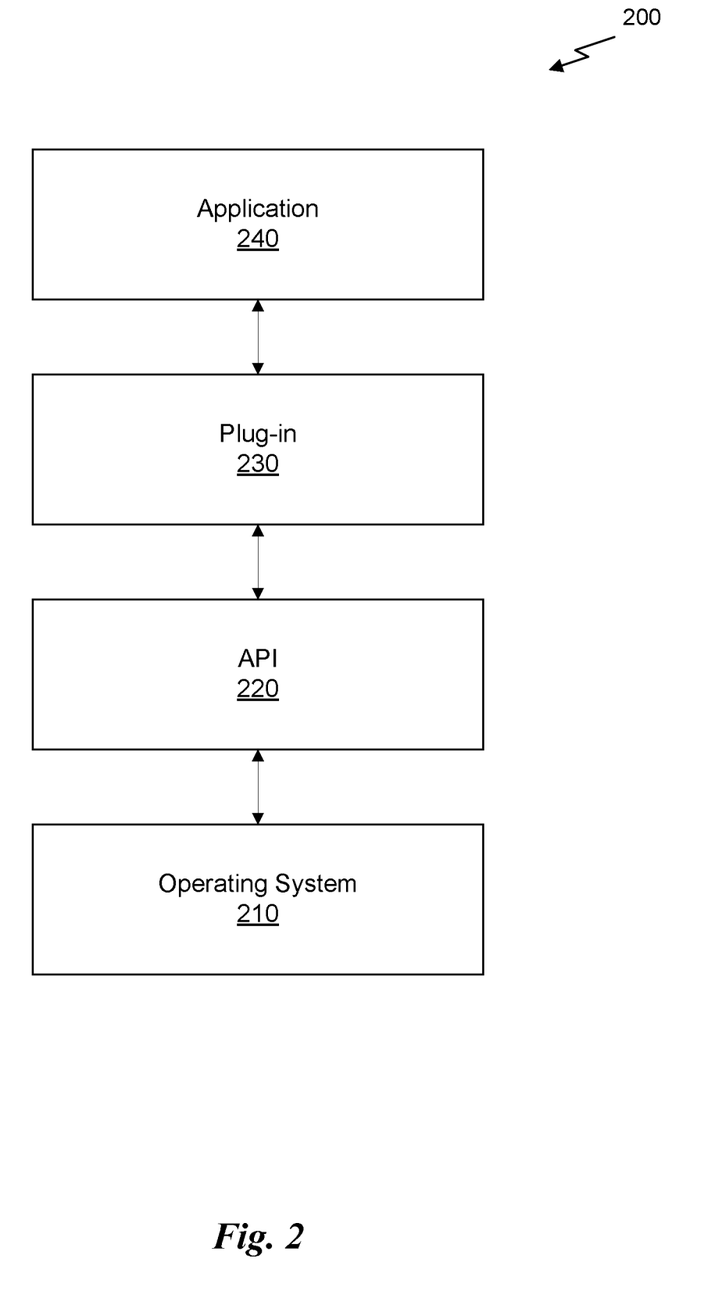
FIG. 2 illustrates a software environment of the mobile device, in accordance with one embodiment.

FIG. 2 illustrates a software environment 200 of the mobile device 100, in accordance with one embodiment. The mobile device 100 may be configured to load an operating system 210 into the memory 160. The operating system 210 is executed by the CPU 120. The operating system 210 manages various hardware interfaces of the mobile device 100 and enables applications to be executed using the CPU 120 and/or GPU 130. The operating system 210 may include an operating system kernel, which is the set of instructions that define the core of the operating system. The kernel may establish data structures in the memory 160 that enable multiple processes to be managed by the operating system concurrently. The kernel may also implement functions for power management, scheduling, and the operation of various hardware resources. The operating system 210 may also include device drivers that implement various functions associated with components of the mobile device 100. For example, a device driver may be installed for a GPU 130 that enables the CPU 120 to offload various operations to the GPU 130. A device driver may also be installed for the display device 180, RF transceiver 150, non-volatile storage 170, network interface controller (NIC), input devices such as a keyboard, mouse, touchpad or touchscreen, and the like.

In one embodiment, the operating system 210 divides a virtual address space into a kernel space and a user space. The kernel space is a range of virtual addresses that are allocated to the operating system kernel and related processes, and the user space is a range of virtual addresses that are allocated to normal processes. In other words, certain programs, such as the operating system kernel and certified device drivers, may be executed in the kernel space while other applications are executed in the user space. Processes executing in user space may not be allowed to access memory in the kernel space, which prevents these processes from crashing the system and accessing hardware resources directly. However, certain processes running in kernel space may implement an application programming interface (API) that can be called from processes running in user space, such that certain low-level functions can be accessed by processes running in user space in a safe manner.

An application 240 is stored in the memory 160 and may be executed by the CPU 120 within the software environment 200. In one embodiment, the application 240 is a web browser. Other suitable applications are possible. A plug-in or other software component 230 may be provided that adds certain functionality within the application 240. In one embodiment, the plug-in 230 is a program that enables the mobile device 100 to switch between a normal mode and a low-power mode during the playback of video content. The plug-in 230 may be stored in the non-volatile storage 170 of the mobile device 100 and loaded into the memory 160 when a user opts to run the application 240. The plug-in 230 is configured to detect when video content is loaded into a window of the application 240. When the video content is detected, the plug-in 230 may determine if the video content is associated with any unwanted content. The unwanted content may include advertising content included in the video content as one or more frames of video, advertising content embedded in the window and displayed next to the video content, or any additional content embedded in the window and display next to the video content.

For example, the unwanted content may include advertising content included in the video content. A commercial may refer to, e.g., a 30-second clip included within the video content that includes images related to a product or service that may not be associated with the main subject matter of the video. The advertising content may then be defined as the one or more commercials (e.g., sequences of frames) included in the video content. The unwanted content may also include elements not directly contained within the video content. For example, unwanted content may refer to text, sponsored links, images, embedded video, and/or other elements displayed alongside the video content within the window of the application 240.

In one embodiment, particular elements of certain websites are flagged as unwanted content and stored in a database. When a markup language document is loaded by the plug-in 230, the plug-in 230 may query the database using the uniform resource locator (URL) for the markup language document to determine if any elements of the webpage have been flagged as unwanted content. Consequently, any elements flagged in the database may be identified by the plug-in 230 as unwanted content.

If the plug-in 230 determines that the video content is associated with unwanted content, then the plug-in 230 may cause the mobile device 100 to be operated in a different mode of operation during playback of the video content. In one embodiment, the plug-in 230 may utilize an application programming interface (API) 220 that enables the plug-in 230 to change the operating mode of the mobile device 100 between a low-power mode and a normal mode. In one embodiment, the API 220 is implemented in a driver for the PMIC 190. The API 220 may include a set of functions that can be called by the plug-in 230 operating in the user space. The functions may cause the operating system 210 to transmit signals to the PMIC 190 that cause the PMIC 190 to adjust the voltage supplied to the SoC 110 and/or adjust a frequency of the clock domains for the SoC 110. The driver may be executed in a kernel space such that the API 220 provides a bridge between the plug-in 230 operating in the user space and the PMIC 190, which is controlled by the driver operating in the kernel space. In another embodiment, the API 220 is implemented in a driver for the display device 180. The API 220 may include a set of functions for adjusting the brightness of a backlight of the display device 180. The plug-in 230 can control the brightness of the backlight by calling a corresponding function of the API 220. In yet another embodiment, the API 220 is implemented in a driver for the GPU 130. The API 220 may enable the plug-in 230 to specify a resolution of images rendered to the display device 180. For example, the API 220 may include a function that lets the plug-in 230 configure a resolution of a frame buffer that is specified as a render target for pixel data generated from the video content. Thus, the video content may be rendered at a particular resolution as specified by the plug-in 230. The plug-in 230 may adjust the resolution of the video dynamically as each frame of video is rendered by the GPU 130. It will be appreciated that, in some embodiments, more than one API may be implemented in more than one corresponding drivers associated with the operating system 210 in order to enable different functionality to be utilized by the plug-in 230 executing in the user space. In other embodiments, the operating system kernel itself may implement an API, through defined system calls, that enable different functionality to be utilized by the plug-in 230 executing in the user space.

In one embodiment, the plug-in 230 is configured to switch the mobile device 100 into a low-power mode using the API 220. The low-power mode may include any steps to save power by, for example, a combination of DVFS, reduction in brightness of the display device, and reduction in resolution of rendered images for display. The plug-in 230 may switch the mobile device 100 into the low-power mode during playback of the video content in the application in response to detecting the unwanted content.

It will be appreciated that, in some embodiments, the application 240 and plug-in 230 may be implemented as a single application. For example, the functionality of the plug-in 230 may be implemented within a media viewer application such as a video player. In such embodiments, the plug-in 230 is not a separate extension of a base application such as a web-browser.

Figure 3A:
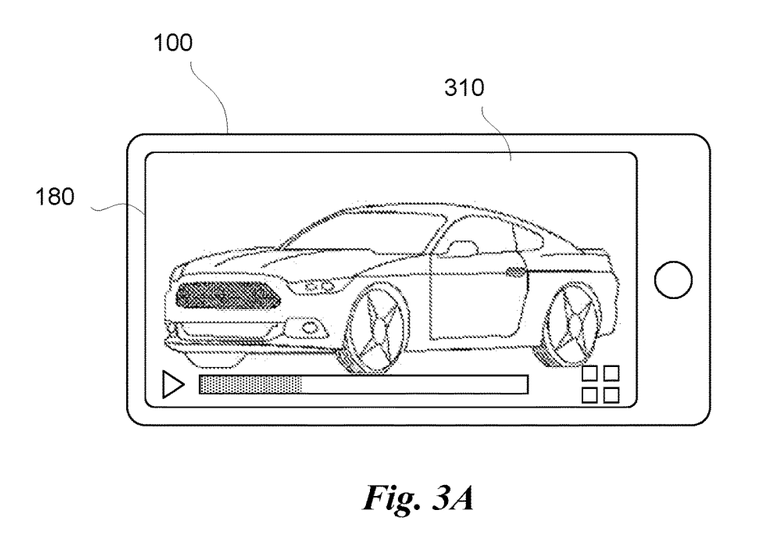
FIGS. 3A through 3C illustrate video content displayed by a mobile device, in accordance with one embodiment.
Figure 3B:
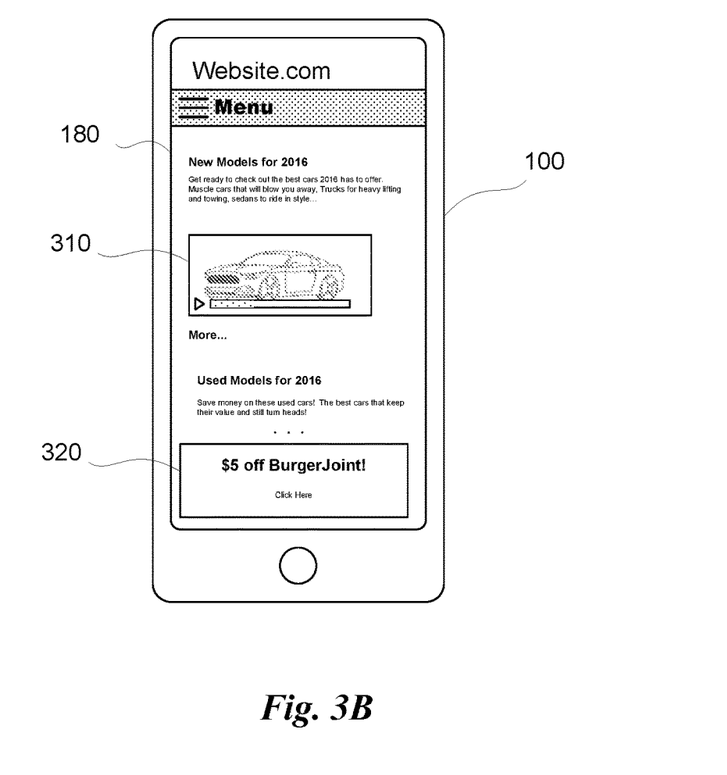
Figure 3C:
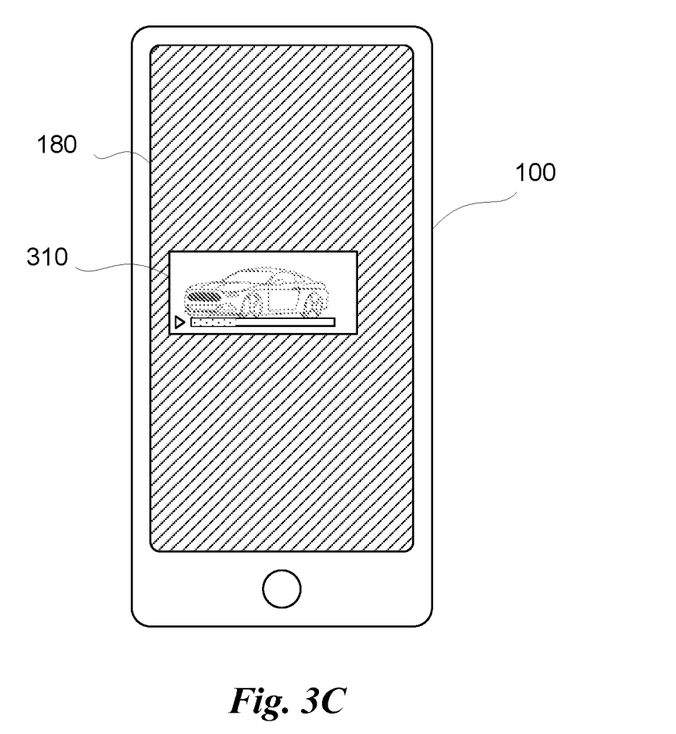

FIGS. 3A through 3C illustrate video content 310 displayed by a mobile device 100, in accordance with one embodiment. In one embodiment, the application 240 may be a web browser configured to read a markup language document (e.g., HTML document, XML document, etc.) that includes at least one element associated with video content (other suitable types of applications are possible). For example, HTML documents may include a video element that specifies a source location of a video file to be displayed within a window of the web browser. The HTML element may also specify various parameters such as whether the video content should begin playing when the document is first loaded into the window or whether a user must first click on the HTML element within the web browser to initiate playback of the video content. Furthermore, the video content may be played back within the extents of the HTML element as rendered in the window of the web browser (i.e., embedded mode) or using the full extents of the display device 180 (i.e., full-screen mode).

As shown in FIG. 3A, a mobile device 100 includes a display device 180 that is playing video content 310 in a full-screen mode. The video content 310 may block any other elements of the web page from being displayed as the video content 310 is overlaid on top of the graphical representation of the web browser. The plug-in 230 is configured to detect when video content is played in full-screen mode. In full-screen mode while the video content is playing, the plug-in 230 is configured to detect advertising content included in the video content as one or more frames of video. In one embodiment, advertising content may be specified using identifying markers included in metadata associated with the video content. The markers specify explicit start points and end points of the advertising content included in the video content. The markers may comprise timestamps that indicate where in the video the advertising content starts and stops. The markers may be stored as metadata associated with the video file encoding the video content. Alternatively, the markers can be included directly in the video content encoded within the video file, such as by encoding a signal specifying the markers in the vertical blanking interval of a frame of video in the video content.

In another embodiment, advertising content may be specified utilizing user feedback to identify explicit start points and end points of the advertising content included in the video content. The plug-in 230 may enable users to indicate that certain frames of video within the video content are advertising content. For example, the plug-in 230 may provide graphical user interface (GUI) elements that let a user click a button to indicate the start and stop of advertising content included in the video content. The feedback provided by the user may be encoded and sent to a server along with feedback from a number of other users. The feedback from a large number of users may be analyzed to determine which portions of video content within a particular video file are advertising content. When the user loads a web page including the video content into the web browser, the plug-in 230 may send a request to the server to determine whether the video content includes advertising content. The server may provide the plug-in 230 with the markers that indicate which frames of video within the video content are advertising content.

In yet another embodiment, the plug-in 230 may be configured to analyze the video content to identify keywords or images corresponding to advertising content. Commercials are typically separated from other scenes in the video content by black frames for a small number of frames. Therefore, the plug-in 230 can analyze each frame of video in the video content to determine a demarcation between different scenes and then analyze each scene for various keywords or images that indicate that the scene is advertising content. For example, a scene may include at least one frame with a company's name or logo that is commonly used in commercials produced by that company. Image analysis can be used to identify the name or logo within the scene and then the start and stop of the scene, as defined by the black frames, may be specified as the start and stop of the advertising content. Alternatively, a server may analyze the video content in the manner described above and then transmit markers that identify the start and stop of the advertising content to the plug-in 230 on a client device.

It will be appreciated that the techniques for detecting advertising content included within video content described above are merely exemplary embodiments for detecting such advertising content. Other well-known techniques for detecting advertising content included within video content may be utilized by a plug-in 230 and/or service accessible via a server in lieu of the techniques described above and are within the scope of the present disclosure.

The plug-in 230 is configured to configure the mobile device 100 to operate in a low-power mode during playback of the video content 310. In the low-power mode, the plug-in 230 may utilize DVFS to save power by operating a processor of the mobile device 100, such as the SoC 110, at a lower voltage and/or lower frequency while the advertising content is being displayed. In one embodiment, the plug-in 230 is configured to cause the mobile device 100 to enter the low-power mode by calling an application programming interface (API) method in response to detecting the display of the advertising content on the mobile device 100. Detecting the display of the advertising content may refer to detecting a frame that marks the start of advertising content within the video content 310. The plug-in 230, executing in the user space, calls the API method, which generates a system interrupt. The system interrupt is processed by the operating system 210 and/or a device driver for the PMIC 190, which generate a signal on an I/O port of the SoC 110 that is transmitted to the PMIC 190. The signal instructs the PMIC 190 to reduce a voltage supplied to the SoC 110 and/or reduce a frequency of the clock domains utilized by the SoC 110. Once the advertising content has been displayed, the plug-in 230 may cause the mobile device 100 to return to the normal operating mode while playback of the video content is completed.

In another embodiment, in the low-power mode, the plug-in 230 may reduce the resolution of the video content by configuring the GPU 130 to render the frames of video marked as advertising content at a lower resolution. For example, the video content rendered by the GPU 130 and displayed on the display device 180 may be rendered at a first resolution such as 1920×1080 pixels. The GPU 130 may be configured to render the video content 310 to a frame buffer configured according to the first resolution. The plug-in 230 is configured to send a command to the GPU 130 that configures a new frame buffer at a lower resolution, such as 640×480 pixels. Each frame of advertising content is then rendered to the new frame buffer at the lower resolution. In addition, the GPU 130 may be configured to utilize lower-quality rendering techniques. For example, the GPU 130 may be configured to render the video content 310 into the high resolution frame buffer using MSAA or SSAA techniques in the normal mode, but GPU 130 may be re-configured to render the advertising content into the low-resolution frame buffer using a single sample per pixel in the low-power mode. The effect of reducing the resolution of the video content during display of the advertising content is that fewer pixels and/or samples per pixel will need to be rendered by the GPU 130, which can drastically reduce the time to render each frame by the GPU 130. Power saving modes, such as clock gating the GPU 130 within the SoC 110 when the GPU 130 is inactive between frames, can save significant amounts of power. The quality of the images displayed for the advertising content may be much less than the quality of the images displayed for the video content, but the viewer will typically not be adverse to the reduction in quality when the reduction extends the life of the battery in the mobile device 100.

In yet another embodiment, in the low-power mode, the plug-in 230 may reduce a brightness level of a display device 180 included in the mobile device 100. In one embodiment, the plug-in 230 is configured to cause the mobile device 100 to enter the low-power mode by calling an application programming interface (API) method in response to detecting the display of the advertising content on the mobile device. The plug-in 230, executing in the user space, calls the API method, which generates a system interrupt. The system interrupt is processed by the operating system 210 and/or a device driver for the display device 180, which generate a signal on an I/O port of the SoC 110 that is transmitted to the display device 180. The signal instructs a backlight controller of the display device 180 to reduce the brightness of the display device 180. The brightness of the display device 180 may, therefore, be reduced by, e.g., 50% while advertising content is presented on the display device 180 during playback of the video content. Again, this reduction in brightness may be very noticeable to a viewer while advertising content is being played, but the viewer will typically not be adverse to the reduction in brightness when the reduction extends the life of the battery in the mobile device 100. Reducing the brightness of the backlight may save significant power consumed by the display device 180 while advertising content is being played in a full-screen mode.

In some embodiments, the plug-in 230 may be configured to combine two or more of the techniques described above when operating the mobile device 100 in the low-power mode. For example, the plug-in 230 may configure the device to use a lower voltage and/or frequency utilizing DVFS as well as reducing the resolution of the advertising content rendered for display and reducing a brightness of the screen during playback of the advertising content. Combinations of these power-saving techniques may be used to further reduce the power consumption of the mobile device 100 in the low-power mode.

Once the advertising content has completed playback, then the plug-in 230 is configured to return the mobile device 100 to normal mode. The plug-in 230 may generate a system call via the API 220 that is processed by the operating system and/or device driver of the PMIC 190 to transmit a signal to the PMIC 190 to increase the voltage and/or frequency of the clock domains of the SoC 110 to the higher voltage and higher frequency. The plug-in 230 may also configure the GPU 130 to render the video content 310 at the higher resolution by reconfiguring the frame buffer, and increase the brightness of the screen by generating a system call via the API 220 that is processed by the operating system and/or device driver of the display device 180 to transmit a signal to the backlight controller of the display device 180.

The video content 310 is not always displayed in full-screen mode. Some video content 310 may be played back in an embedded mode, where the video content 310 is viewed within the extents of an element of a web page. The web page may also include other elements such as text, a menu, hyperlinks, etc. Some of the other elements may also include unwanted content 320, such as a banner advertisement that is an image that is typically associated with a hyperlink. When the video content 310 is played back in the embedded mode, the plug-in 230 is configured to mask the unwanted content 320 such as by rendering only the video content 310 over a black background, as shown in FIG. 3C. Masking the other elements of the web page effectively prevents the unwanted content 320 from being displayed. In addition, the plug-in 230 may configure the SoC 110 to throttle one or more threads associated with the unwanted content 320. For example, some unwanted content 320 may include an animation or video embedded in the web page as a second element separate from the video content 310. Separate threads may be allocated to render the video content 310 and the unwanted content 320. When the user begins playback of the video content 310, the plug-in 230 is configured to deactivate (i.e., throttle) the thread associated with the unwanted content 320, while the thread associated with the video content 310 remains active. Other threads may be throttled as well, such as threads related to other elements of the web page.

In some embodiments, the video content 310 playing in the embedded mode also has advertising content included therein. In other words, a subset of frames included in the video content 310 are identified as advertising content as well as the unwanted content 320 displayed outside of the element where the video content 310 is rendered. In addition to implementing the techniques of masking and thread throttling described above to suppress rendering of unwanted content 320 that is separate from the video content 310 in a low-power mode, the plug-in 230 may be configured to implement the techniques described above (DVFS, reduced resolution, and reduced brightness) when the advertising content included within the video content 310 is displayed.

In one embodiment, content associated with video content can be assigned different priority levels. For example, advertising content included within a video can be assigned a first priority level, advertising content embedded in a webpage alongside the video content can be assigned a second priority level, and additional elements of the webpage (e.g., navigation menus, links to additional articles, etc.) can be assigned a third priority level. A user may designate a threshold for priority levels that are identified as unwanted content. For example, one user may only want to designate advertising content included in the video content as unwanted content such that the low-power mode is only entered when the advertising content is displayed during playback of the video content. Another user may designate both advertising content included in the video content as well as other advertising content embedded in the webpage as unwanted content. Yet another user may designate advertising content (both included in the video content and embedded in the webpage alongside the video content) as well as additional elements as unwanted content.

Figure 4:
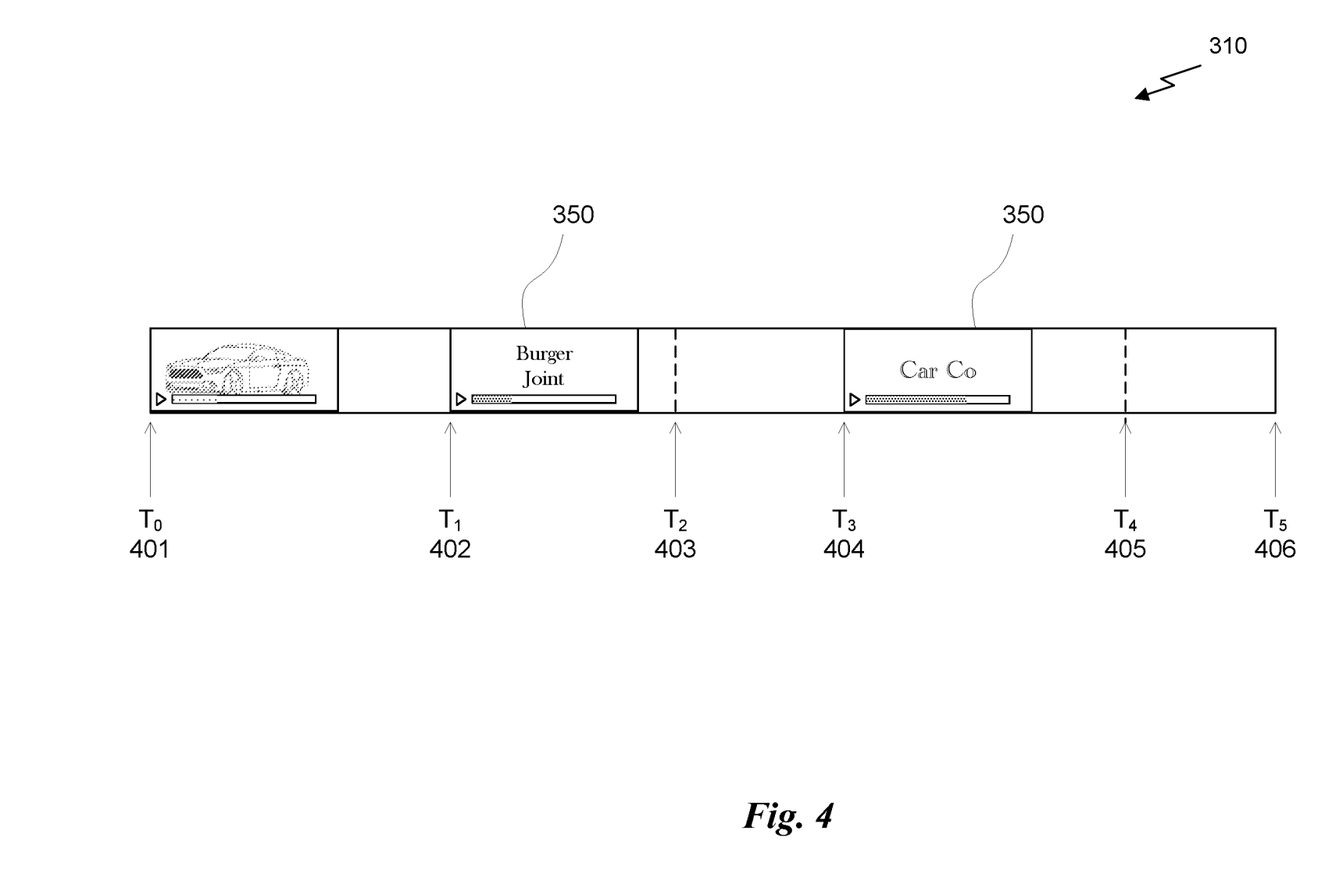
FIG. 4 illustrates video content that includes advertising content, in accordance with one embodiment.

FIG. 4 illustrates video content 310 that includes advertising content 350, in accordance with one embodiment. As shown in FIG. 4, the video content 310 includes a sequence of frames that can be played back by rendering each frame to the display device 180. The video content 310 starts at a time $T_0$ 401 where a first frame of video content 310 is encoded in a file format for video (e.g., MPEG-4 AVC, AVI, MOV, etc.). The video content 310 includes a number of frames until a time $T_1$ 402, where a first frame of advertising content 350 appears in the sequence of frames. The advertising content 350 may be a 30 second commercial for a product or service. As shown in FIG. 4, the commercial is for a company called Burger Joint. The last frame of advertising content 350 in the commercial is located at a time $T_2$ 403. Additional advertising content 350 included in the video content 310, such as a commercial for Car Co., may be located at frames between time $T_3$ 404 and $T_4$ 405, and the end of the video content 310 is at time $T_5$ 406.

The plug-in 230 is configured to detect the video content 310 to be viewed within an application of the mobile device 100. The plug-in 230 is also configured to detect the unwanted content associated with the video content 310, such as detecting the advertising content 350 included in the video content 310 by reading markers from the metadata associated with video content 310 that indicates that advertising content 350 is included in the video content 310 between times $T_1$ 402 and $T_2$ 403 as well as between times $T_3$ 404 and $T_4$ 405. Then, during playback of the video content 310, the plug-in 230 is configured to operate the mobile device 100 in normal mode from time $T_0$ 401 to time $T_1$ 402, in low-power mode from time $T_1$ 402 to time $T_2$ 403, in normal mode from time $T_2$ 403 to time $T_3$ 404, in low-power mode from time $T_3$ 404 to time $T_4$ 405, and in normal mode from time $T_4$ 405 to time $T_5$ 406.

Figure 5:
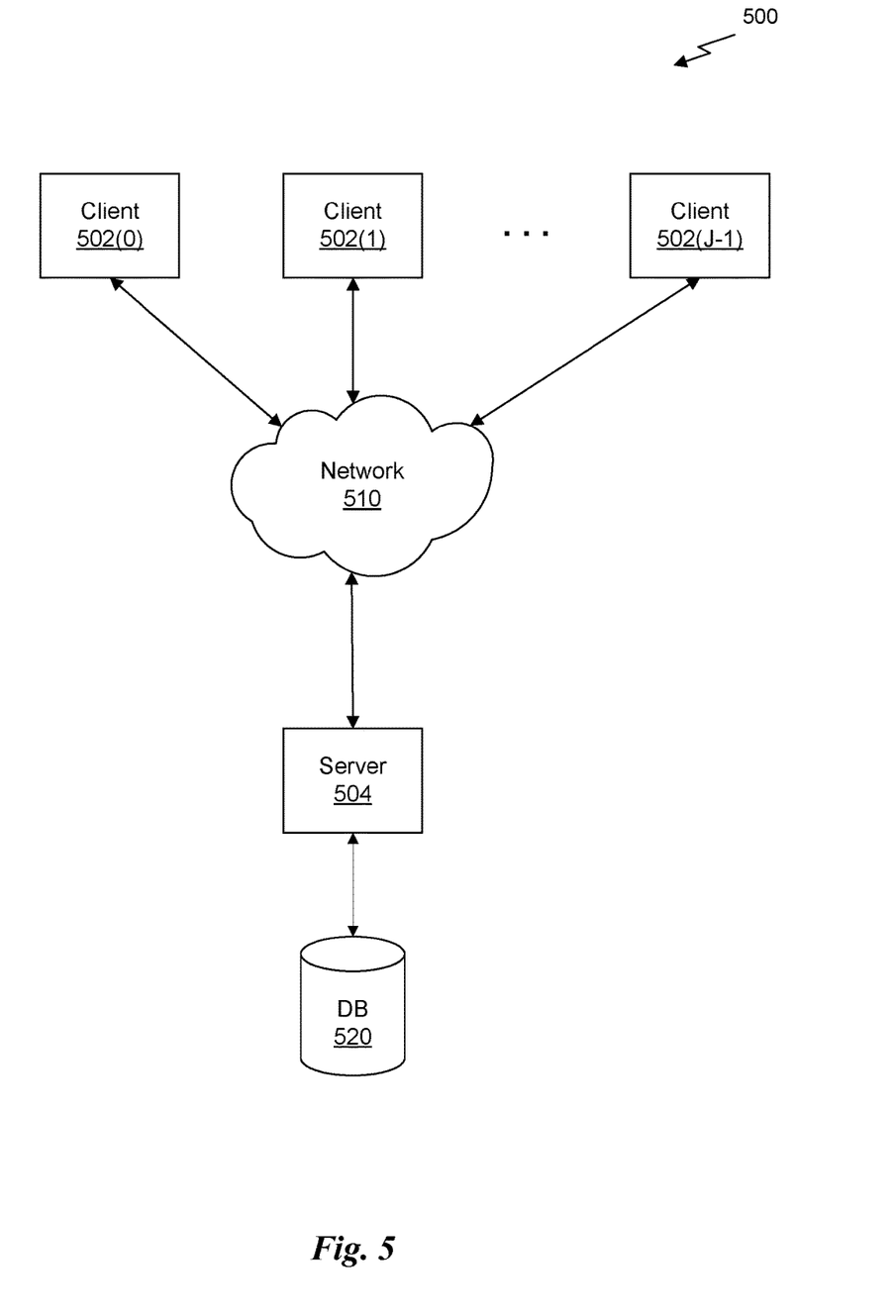
FIG. 5 illustrates a system for detecting unwanted content associated with video content, in accordance with one embodiment.

FIG. 5 illustrates a system 500 for detecting unwanted content associated with video content, in accordance with one embodiment. As shown in FIG. 5, J client nodes 502 are coupled to a server node 504 via a network 510. In one embodiment, the network 510 is the Internet and the nodes communicate via the TCP/IP protocol. Each client node 502 may be a mobile device 100, which includes the plug-in 230 and application 240.

In one embodiment, the plug-in 230 of the mobile device 100 may transmit feedback information from the client node 502 to the server node 504. The feedback information is stored in a database 520 that correlates a file name for the video content with the user-generated markers that indicate the location of advertising content 350 included within the video content 310. The server node 504 may include software to analyze the feedback from a plurality of client nodes 502 to generate markers for identifying advertising content 350 included in the video content 310. After feedback from a number of users has been received, the server node 504 may analyze all of the feedback information to identify the advertising content 350 in the video content 310.

For example, each user may indicate where in the video content 310 advertising content 350 starts and stops. An algorithm executed by the server node 504 may count the number of users that identified each frame of video content 310 as advertising content 350. Any frames with a number of users that identified that frame as advertising content 350 above a threshold number of users are then identified as advertising content 350. The algorithm may then estimate where advertising content 350 starts and stops within the video content 310 based on which frames have been identified by users as advertising content 350. Markers that identify those frames as advertising content 350 may then be generated and correlated to that particular video file.

In another embodiment, the server node 504 includes software for performing image analysis on the frames of video content 310. The server node 504 may compare objects in each frame with known objects associated with advertising content 350, such as a number of well-known company trademarks. The server node 504 may also identify keywords from text included in the frames that are associated with advertising content. The analysis may identify certain frames of video as likely advertising content 350. The server node 504 may then estimate where advertising content 350 starts and stops within the video content 310 based on which frames have been identified via image analysis as advertising content 350. Markers that identify those frames as advertising content 350 may then be generated and correlated to that particular video file.

In addition to identifying advertising content 350 included within video content 310, the server node 504 may be used to identify unwanted content that is not included within the video content 310. In one embodiment, users may mark specific elements of a markup language document as unwanted content and submit their feedback to the server node 504. The server node 504 may collect user feedback and add the feedback to a database. Once a threshold number of users have identified a particular element in a markup language document as unwanted content, then the server node 504 may mark that element as unwanted content in a database. The server node 504 may then identify that element as unwanted content in response to a request from a client node 502.

During playback of the video content, the plug-in 230 may then request information from the server node 504 in order to identify the location of advertising content 350 included in the video content 310 and/or unwanted content associated with the video content 310.

Figure 6:
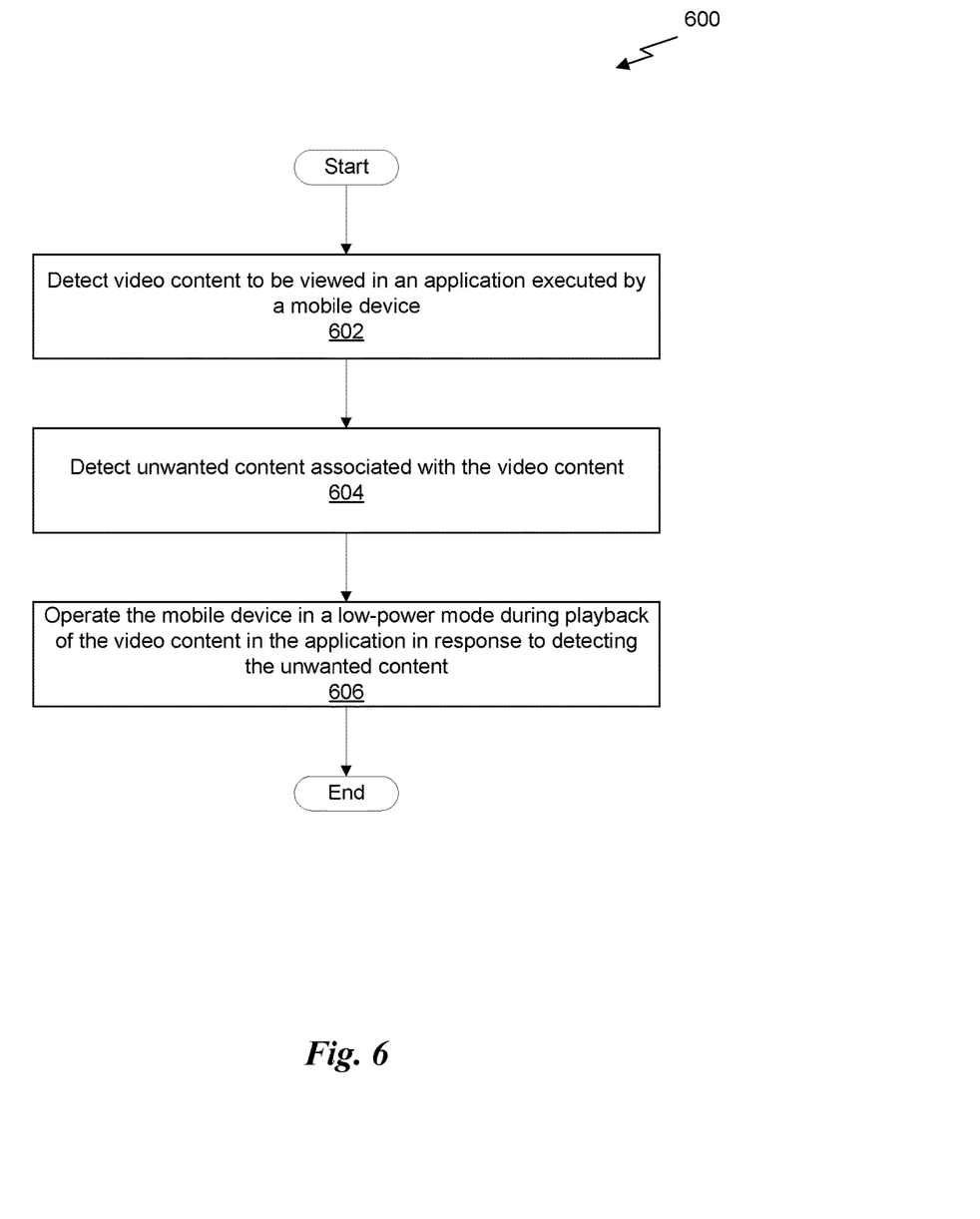
FIG. 6 is a flowchart of a method for reducing the power consumption of a mobile device, in accordance with one embodiment.

FIG. 6 is a flowchart of a method 600 for reducing the power consumption of a mobile device, in accordance with one embodiment. At step 602, video content 310 to be viewed in an application 240 executed by a mobile device 100 is detected. In one embodiment, the application is a web browser, and the video content is detected while parsing markup language documents. An element of the markup language document may be identified during parsing the markup language document to identify a multimedia element that includes a pointer to a video file that indicates that video content is going to be embedded within a browser window that is displayed to a user of the mobile device 100. In another embodiment, the application may be a media player application, and the video content is detected when a user requests the application open a particular file having a video format.

At step 604, unwanted content associated with the video content 310 is detected. In one embodiment, a plug-in 230 for the application determines whether the video content 310 includes advertising content 350 by requesting such information from a server node 504. In another embodiment, the plug-in 230 reads metadata associated with the video content 310 in order to determine that the video content 310 includes advertising content 350. In yet another embodiment, the plug-in 230 identifies whether the video content 310 is played in a full-screen mode or an embedded mode. If the video content is played in an embedded mode, then unwanted content 320 may be identified by querying a server node 504. In yet another embodiment, unwanted content may be identified as any content rendered outside the extents of the video content 310.

At step 606, the mobile device 100 is configured to operate in a low-power mode during playback of the video content in the application in response to detecting the unwanted content. In one embodiment, the plug-in 230 may mask any elements displayed alongside the video content 310 and throttle any threads associated with the unwanted content during playback of the video content 310. In another embodiment, the plug-in 230 may cause the mobile device 100 to operate in the low-power mode when advertising content 350 included in the video content 310 is displayed during playback of the video content 310.

Figure 7:
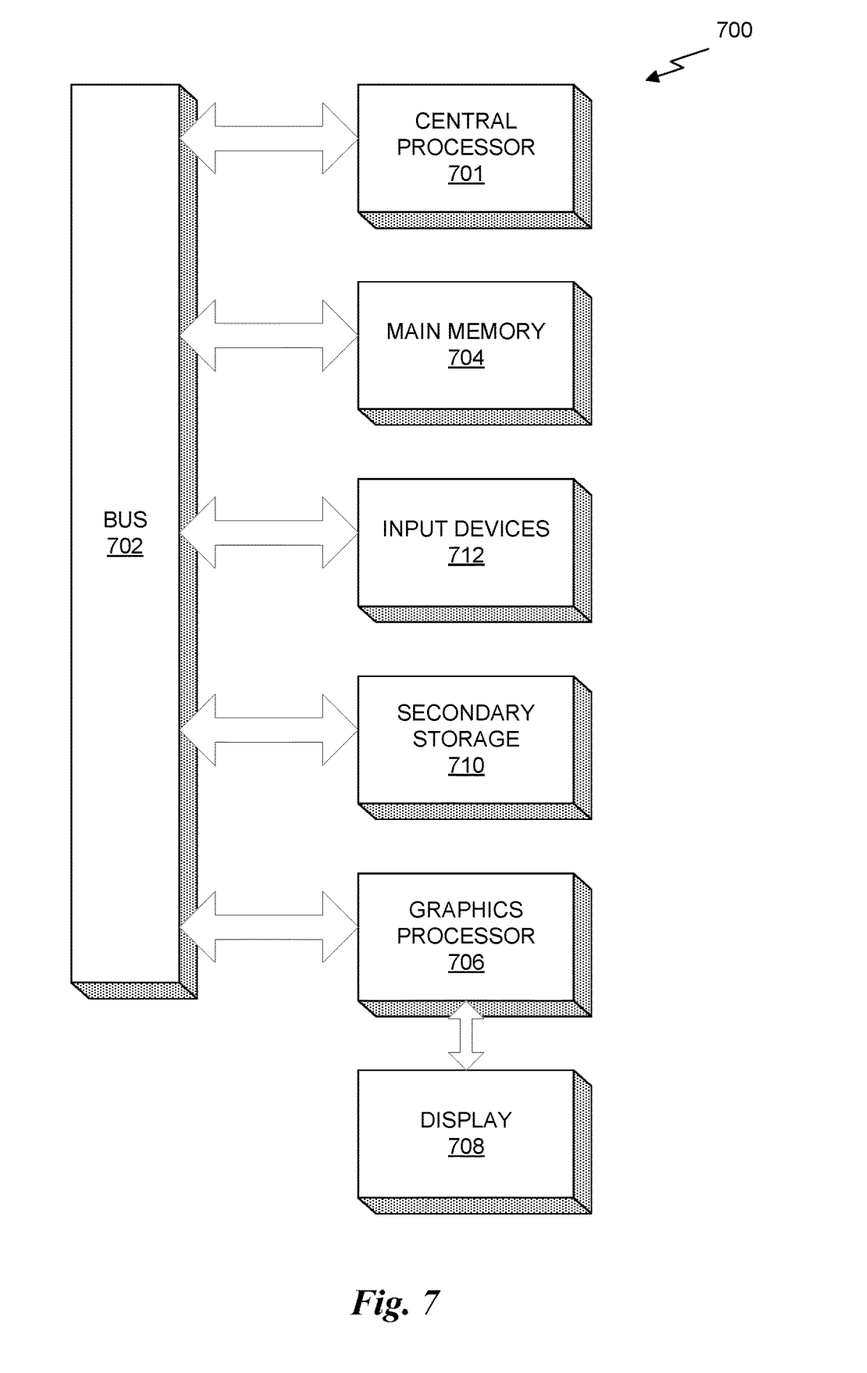
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

The computer-readable non-transitory media includes all types of computer-readable media, including magnetic storage media, optical storage media, and solid state storage media and specifically excludes signals. It should be understood that the software can be installed in and sold with the mobile device. Alternatively, the software can be obtained and loaded into the mobile device, including obtaining the software via a disc medium or from any manner of network or distribution system, including, for example, from a server owned by the software creator or from a server not owned but used by the software creator. The software can be stored on a server for distribution over the Internet, for example.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method for reducing power consumption of a mobile device, comprising:

detecting video content to be viewed in an application executed by the mobile device;
detecting unwanted content associated with the video content; and
operating the mobile device in a low-power mode during playback of the video content in the application in response to detecting the unwanted content, wherein operating the mobile device in the low-power mode comprises at least one of using Dynamic Voltage and Frequency Scaling (DVFS) to adjust power consumption of a processor included in the mobile device, reducing the resolution of a display device included in the mobile device, or reducing a brightness level of the display device.

2. The method of claim 1, wherein the unwanted content includes advertising content included in the video content as one or more frames of video.

3. The method of claim 1, wherein the unwanted content is embedded within a markup language document displayed in a web browser, and wherein the video content is displayed next to the unwanted content.

4. The method of claim 1, wherein the video content is displayed in an embedded mode, and wherein operating the mobile device in the low-power mode further comprises at least one of masking the unwanted content or throttling one or more threads associated with the unwanted content.

5. The method of claim 1, wherein the application includes a plug-in configured to call an application programming interface (API) method in response to detecting the unwanted content to cause the mobile device to enter the low-power mode.

6. The method of claim 5, wherein the API is implemented by a device driver executed in a kernel-space of an operating system.

7. The method of claim 1, wherein detecting the unwanted content comprises at least one of:
identifying markers included in metadata associated with the video content, wherein the markers specify explicit start points and end points of advertising content included in the video content;
utilizing user feedback to identify explicit start points and end points of advertising content included in the video content; or
analyzing the video content to identify keywords or images corresponding to advertising content.

8. The method of claim 1, wherein detecting video content comprises parsing a markup language document to identify a multimedia element that includes a pointer to a video file.

9. A mobile device, comprising:
a non-transitory memory storage comprising instructions; and
one or more processors in communication with the memory, wherein the one or more processors execute the instructions to:
detect video content to be viewed in an application;
detect unwanted content associated with the video content; and
operate the mobile device in a low-power mode during playback of the video content in the application in response to detecting the unwanted content, wherein operating the mobile device in the low-power mode comprises at least one of using Dynamic Voltage and Frequency Scaling (DVFS) to adjust power consumption of a processor included in the mobile device, reducing the resolution of a display device included in the mobile device, or reducing a brightness level of the display device.

10. The mobile device of claim 9, wherein the unwanted content includes advertising content included in the video content as one or more frames of video.

11. The mobile device of claim 9, wherein the unwanted content is embedded within a markup language document displayed in a web browser, and wherein the video content is displayed next to the unwanted content.

12. The mobile device of claim 9, wherein the video content is displayed in an embedded mode, and wherein operating the mobile device in the low-power mode further comprises at least one of masking the unwanted content or throttling one or more threads associated with the unwanted content.

13. The mobile device of claim 9, wherein the application includes a plug-in configured to call an application programming interface (API) method in response to detecting the unwanted content to cause the mobile device to enter the low-power mode.

14. The mobile device of claim 13, wherein the API is implemented by a device driver executed in a kernel-space of an operating system.

15. The mobile device of claim 9, wherein detecting the unwanted content comprises at least one of:
identifying markers included in metadata associated with the video content, wherein the markers specify explicit start points and end points of advertising content included in the video content;
utilizing user feedback to identify explicit start points and end points of advertising content included in the video content; or
analyzing the video content to identify keywords or images corresponding to advertising content.

16. A non-transitory computer-readable media storing computer instructions for reducing power consumption of a mobile device that, when executed by one or more processors, cause the one or more processors to perform the steps of:
detecting video content to be viewed in an application executed by the mobile device;
detecting unwanted content associated with the video content; and
operating the mobile device in a low-power mode during playback of the video content in the application in response to detecting the unwanted content wherein operating the mobile device in the low-power mode comprises at least one of using Dynamic Voltage and Frequency Scaling (DVFS) to adjust power consumption of a processor included in the mobile device, reducing the resolution of a display device included in the mobile device, or reducing a brightness level of the display device.

17. The non-transitory computer-readable media of claim 16, wherein the video content is displayed in an embedded mode, and wherein operating the mobile device in the low-power mode further comprises at least one of masking the unwanted content or throttling one or more threads associated with the unwanted content.

* * * * *